(12) United States Patent
Zhou

(10) Patent No.: US 9,867,231 B2
(45) Date of Patent: Jan. 9, 2018

(54) MULTI-MODE TERMINAL AND HANDOVER METHOD FOR MULTI-MODE TERMINAL

(71) Applicant: ZTE CORPORATION, Shenzhen, Guangdong Province (CN)

(72) Inventor: Zhenglin Zhou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 171 days.

(21) Appl. No.: 14/652,142

(22) PCT Filed: Aug. 21, 2013

(86) PCT No.: PCT/CN2013/081946
§ 371 (c)(1),
(2) Date: Jun. 15, 2015

(87) PCT Pub. No.: WO2013/189397
PCT Pub. Date: Dec. 27, 2013

(65) Prior Publication Data
US 2015/0327329 A1    Nov. 12, 2015

(30) Foreign Application Priority Data

Dec. 20, 2012  (CN) .......................... 2012 1 0558738

(51) Int. Cl.
*H04W 88/06* (2009.01)
*H04W 36/34* (2009.01)
(Continued)

(52) U.S. Cl.
CPC .......... *H04W 88/06* (2013.01); *H04B 1/0064* (2013.01); *H04J 3/0685* (2013.01); *H04W 36/34* (2013.01); *H04W 36/0022* (2013.01)

(58) Field of Classification Search
CPC . H04W 36/0022; H04W 36/34; H04W 88/06; H04J 3/0685; H04B 1/0064
(Continued)

(56) References Cited

U.S. PATENT DOCUMENTS

2005/0271018 A1   12/2005   Liu et al.
2009/0131054 A1   5/2009    Zhang

FOREIGN PATENT DOCUMENTS

| CN | 102209402 A | 10/2011 |
|----|-------------|---------|
| CN | 102271424 A | 12/2011 |

(Continued)

*Primary Examiner* — Sam Bhattacharya
(74) *Attorney, Agent, or Firm* — Ling Wu; Stephen Yang; Ling and Yang Intellectual Property

(57) ABSTRACT

A multi-mode terminal includes: a power management chip, a digital baseband chip, a first radio frequency chip, a second radio frequency chip, a first card socket, a second card socket, a first clock source and a second clock source, wherein the power source management chip is connected to the digital baseband chip, the first card socket and the second card socket; the digital baseband chip is further connected to the first card socket and the second card socket, and is connected to the first radio frequency chip and the second radio frequency chip; the first clock source is connected to the first radio frequency chip; the second clock source is connected to the second radio frequency chip, a clock path is further connected between the first radio frequency chip and second radio frequency chip, and the first radio frequency chip provides an output clock to the second radio frequency chip.

10 Claims, 7 Drawing Sheets

(51) Int. Cl.
*H04J 3/06* (2006.01)
*H04B 1/00* (2006.01)
*H04W 36/00* (2009.01)

(58) Field of Classification Search
USPC ............... 455/436, 558; 370/310, 311, 321;
375/270, 298
See application file for complete search history.

(56) References Cited

FOREIGN PATENT DOCUMENTS

| | | | |
|---|---|---|---|
| CN | 102625416 | A | 8/2012 |
| CN | 201663637 | U | 12/2012 |
| CN | 103067907 | A | 4/2013 |
| RU | 2450450 | C2 | 5/2012 |
| RU | 2454040 | C2 | 6/2012 |

MULTI-MODE TERMINAL AND HANDOVER METHOD FOR MULTI-MODE TERMINAL

TECHNICAL FIELD

The present document relates to the field of terminal hardware, and more particularly, to a multi-mode terminal and a handover method for multi-mode terminal.

BACKGROUND OF THE RELATED ART

At present, some telecom operators have many networks with different modes, for example, China Unicom has the GSM (Global System for Mobile Communications) network and the WCDMA (Wideband Code Division Multiple Access) network, China Mobile has the GSM network, the TD-SCDMA (Time Division Synchronous Code Division Multiple Access) network and the TD-LTE (time division long-term evolution) network. Currently, the voice service in the LTE network uses the CSFB (Circuit Switched FallBack) technology for voice call and requires the LTE terminal in the LTE network to fall back to the GSM network or any other voice-enabled network, which requires the LTE terminal to support the LTE mode and other modes, and support quickly switching between the LTE mode and the other modes.

Moreover, the LTE terminal needs to achieve the co-transmission of PS (packet switched) data and CS (Circuit Switched) data in the LTE network, and the LTE terminal needs to simultaneously support working simultaneously in the LTE mode and other modes. In the current mobile terminal users, one user will have more than one USIM (Universal Subscriber Identity Module) card/SIM (Subscriber Identity Module) card, and different cards are in different networks or each USIM card/SIM card corresponds to a different network, which requires the mobile terminal to support single-card multi-mode and multi-card multi-standby.

FIG. 1 is an architectural block diagram of the radio frequency section of a conventional dual-mode dual-standby terminal, comprising two independent power management chips (PMUs), two independent radio frequency chips, two independent digital baseband chips, two independent SIM card sockets and two independent clock sources. Because it comprises two independent digital baseband chips and two independent power management chips, a larger area is occupied during the layout. There are two independent SIM card sockets, two SIM cards with different modes cannot be arbitrarily placed within any one card socket, while the USIM/SIM card in any card socket can be read or written in any mode, thus achieving the multi-mode multi-standby, but not the switching to the multi-mode single-standby mode.

SUMMARY OF THE INVENTION

To solve the technical problem, the embodiment of the present invention is to provide a multi-mode terminal and a handover method for multi-mode terminal to achieve multi-mode multi-standby and multi-mode single-standby functions.

To solve the abovementioned technical problem, a multi-mode terminal in accordance with the embodiment of the present invention comprises: a power management chip, a digital baseband chip, a first radio frequency chip, a second radio frequency chip, a first card socket, a second card socket, a first clock source and a second clock source, wherein:

the power management chip is connected to the digital baseband chip, the first card socket and the second card socket to supply power to the digital baseband chip, the first card socket and the second card socket;

the digital baseband chip is further connected to the first card socket and the second card socket, and is respectively connected to the first radio frequency chip and the second radio frequency chip through an in-phase/quadrature (I/Q) data line and a control line to transmit, receive and process I/Q signals with supported modes, as well as control transmission paths and reception paths with the supported modes;

the first clock source is connected to the first radio frequency chip to provide a reference clock for the first radio frequency chip; the second clock source is connected to the second radio frequency chip to provide a reference clock for the second radio frequency chip, a clock path is further connected between the first radio frequency chip and the second radio frequency chip, and the first radio frequency chip provides an output clock for the second radio frequency chip through the clock path to serve as the reference clock of the second radio frequency chip.

Alternatively, the digital baseband chip comprises a subscriber identity module (SIM) card processing unit, and the SIM card processing unit comprises a first SIM card processing unit, a second SIM card processing unit, and a multiplexer (MUX) one-to-one corresponding to each pin of the first card socket and the second card socket, one side of the MUX is connected to the corresponding pin, and the other side is respectively connected to functional ends of the first SIM card processing unit and the second SIM card processing unit which correspond to the pins.

Alternatively, the digital baseband chip comprises a clock processing unit, and the clock processing unit comprises a system clock processing unit, a clock selection MUX, a phase lock loop (PLL), a first mode clock module, a second mode clock module, a first clock input end, a second clock input end and a third clock input end, wherein:

the first clock input end is connected to the system clock processing unit to provide a working clock for the system clock processing unit;

the first clock input end, together with the second clock input end, is further connected to the input end of the clock selection MUX, the output end of the clock selection MUX is connected to the input end of the PLL, and the output end of the PLL is connected to the first mode clock module and provides a working clock for the first mode clock module;

the second clock input end is further directly connected to the first mode clock module to provide a working clock for the first mode clock module;

the third clock input end is connected to the second mode clock module to provide a working clock for the second mode clock module.

Alternatively, the first clock input end is further connected to a clock buffer in the first radio frequency chip; the second clock input end is further connected to a clock phase-locked loop (PLL) in the first radio frequency chip; the third clock input end is further connected to the second radio frequency chip.

Alternatively, the second radio frequency chip comprises a clock selection unit, and the clock selection unit comprises a multiplexer and a clock buffer, and the input end of the multiplexer is connected to the clock path and the second clock source, the output end of the multiplexer is connected to the input end of the clock buffer, and the output of the clock buffer serves as the reference clock of the second radio frequency chip.

Alternatively, the digital baseband chip comprises an I/Q data processing unit, and the I/Q data processing unit comprises a first modem and a second modem, and the first modem is connected to the first radio frequency chip via a first IQ data line, a second IQ data line and a first sampling clock interface line; the second modem is connected to the second radio frequency chip through a third IQ data line and a second sampling clock interface line.

Alternatively, the digital baseband chip comprises a system-on-chip (SOC) unit, and the SOC unit comprises a plurality of central processing units (CPUs) and digital signal processing units (DSPs), the plurality of CPUs and DSPs communicate through a crossbar matrix, a plurality of modems with different modes are hung up at ports of the crossbar matrix via an Interconnect matrix, and the plurality of modems with different modes are further connected to the first modem or the second modem.

Alternatively, the digital baseband chip comprises a radio frequency control management unit, and the radio frequency control management unit comprises a radio frequency serial peripheral interface (SPI) control unit, and the radio frequency SPI control unit comprises a first single-dual-mode selector, a second single-dual-mode selector, a first pin multiplexing selector and a second pin multiplexing selector, and the SPI of the first modem is respectively connected to the first single-dual-mode selector and the second single-dual-mode selector, the SPI of the second modem is respectively connected to the first single-dual-mode selector and the second single-dual-mode selector, the first single-dual-mode selector is connected to the SPI pin of the first radio frequency chip through the first pin multiplexing selector, the second single-dual-mode selector is connected to the SPI pin of the second radio frequency chip through the second pin multiplexing selector.

Alternatively, the digital baseband chip comprises a radio frequency control management unit, and the radio frequency control management unit comprises a radio frequency general purpose input output (GPIO) control unit, and the radio frequency GPIO control unit comprises a first mode selector, a second mode selector, a third pin multiplexing selector and a fourth pin multiplexing selector, and a control line of the first modem is respectively connected to the first mode selector and the second mode selector, and a control line of the second modem is respectively connected to the first mode selector and the second mode selector, the first mode selector is connected to the GPIO pin of the first radio frequency chip through the third pin multiplexing selector, and the second mode selector is connected to the GPIO pin of the second radio frequency chip through the fourth pin multiplexing selector.

A handover method for multimode terminal comprises:

a digital baseband chip controlling a second radio frequency chip to select a second clock source as a reference clock;

the digital baseband chip independently and respectively operating modems with different modes;

the digital baseband chip controlling a first single-dual-mode selector to select a serial peripheral interface (SPI) of a first modem, the first single dual-mode selector being connected to the SPI pin of a first radio frequency chip through a first pin multiplexing selector, and controlling a second single-dual-mode selector to select the SPI of a second modem, and the second single-dual-mode selector being connected to the SPI pin of the second radio frequency chip through the second pin multiplexing selector;

the digital baseband chip controlling the first mode selector to select a general purpose input output (GPIO) of the first modem, the first mode selector being connected to the GPIO pin of the first radio frequency chip through a third pin multiplexing selector, and controlling the second mode selector to select the GPIO of the second modem, and the second mode selector being connected to the GPIO pin of the second radio frequency chip through a fourth pin multiplexing selector.

A handover method for multimode terminal comprises:

a digital baseband chip controlling a second radio frequency chip to select an output clock of a first radio frequency chip as a reference clock;

the digital baseband chips independently and respectively operating modems with different modes;

the digital baseband chip controlling a first single-dual-mode selector to select the Serial Peripheral Interface (SPI) of a first modem or the SPI of a second modem, and the first single-dual-mode selector being connected to the SPI pin of the first radio frequency chip through the first pin multiplexing selector, and controlling the second single-dual-mode selector to select the SPI of the first modem or the SPI of the second modem, the second single-dual-mode selector being connected to the SPI pin of the second radio frequency chip through a second pin multiplexing selector;

the digital baseband chip controlling the first mode selector to select the general purpose input output (GPIO) of the first modem or the GPIO of the second modem, the first mode selector being connected to the GPIO pin of the first radio frequency chip via a third pin multiplexing selector, and controlling the second mode selector to select the GPIO of the first modem or the GPIO of the second modem, and the second mode selector being connected to the GPIO pin of the second radio frequency chip through a fourth pin multiplexing selector.

In summary, the multi-mode terminal in the embodiment of the present invention can achieve functions such as multi-mode single-standby, multi-mode dual-standby, single-card multi-mode and dual-card dual-standby to meet current needs of mobile operators and mobile terminal users. Two SIM cards with different modes can be freely placed in any card socket, and the USIM/SIM card in any card socket can be read and written by any mode, which can achieve not only the multi-mode multi-standby, but also the switching to the multi-mode single-standby mode, and not only the dual-card dual-standby, but also the single-card dual-standby.

PREFERRED EMBODIMENTS OF THE INVENTION

The present embodiment provides a multi-mode terminal to achieve multi-mode multi-standby, such as LTE and GSM dual standby, and the LTE multi-mode single-standby terminal has single-card (USIM or SIM card) multi-mode, and dual-card dual-standby functions.

Besides of separate voltage controlled temperature compensated crystal oscillators (respectively VCTCXO1 and VCTCXO2) in two radio frequency chips to provide a reference clock, a clock path is added to provide the output clock of one of the radio frequency chips to the other radio-frequency chip as the reference clock, and when switching from the dual-mode dual-standby to dual-mode single-standby, the two radio frequency chips share one clock reference source.

Pins of the two SIM cards are connected to two SIM card processing units through a port multiplexing way to achieve that one SIM card can communicate with any SIM card processing unit.

The DBB (digital baseband chip) comprises a plurality of central processing units (CPUs) and digital signal processing units (DSPs). The CPUs communicate with the processors via a CROSSBAR MATRIX. MODEMs such as LTE MODEM, TD-SCDMA MODEM, GSM MODEM and WCDMA MODEM are hung at multiple ports of the CROSSBAR MATRIX through an Interconnect Matrix to achieve that any of the CPUs can communicate with any one of the MODEMs, and any two CPUs can simultaneously communicate with two MODEMs.

To independently control the two radio frequency chips in the dual-mode dual-standby state, and to achieve a unified control of the two radio frequency chips in the dual-mode single-standby state, control units such as the serial peripheral interface (SPI) control unit and the general purpose Input Output (GPIO) control unit use the single-dual-mode selector and the multiplexing selector.

To make the purpose, technical solutions and advantages of the embodiments of the present invention more apparent, hereinafter, in conjunction with the accompanying drawings, the embodiments of the present invention will be described in detail. It should be noted that, in the case of no conflict, embodiments of the present application and features in the embodiments may be arbitrarily combined with each other.

Figure 1:
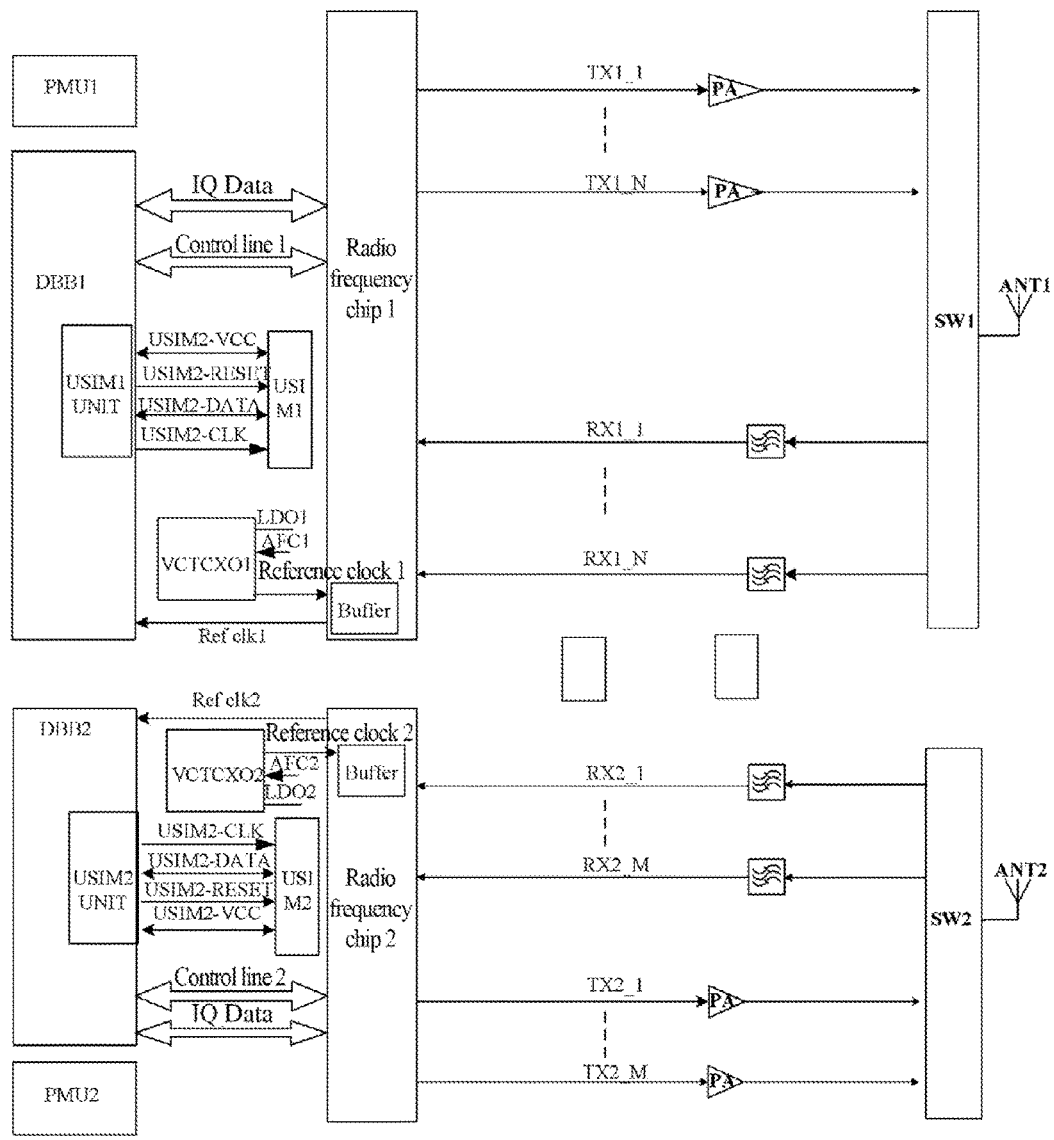
FIG. 1 is an architectural block diagram of the radio frequency portion of a conventional dual-mode dual-standby terminal.
Figure 2:
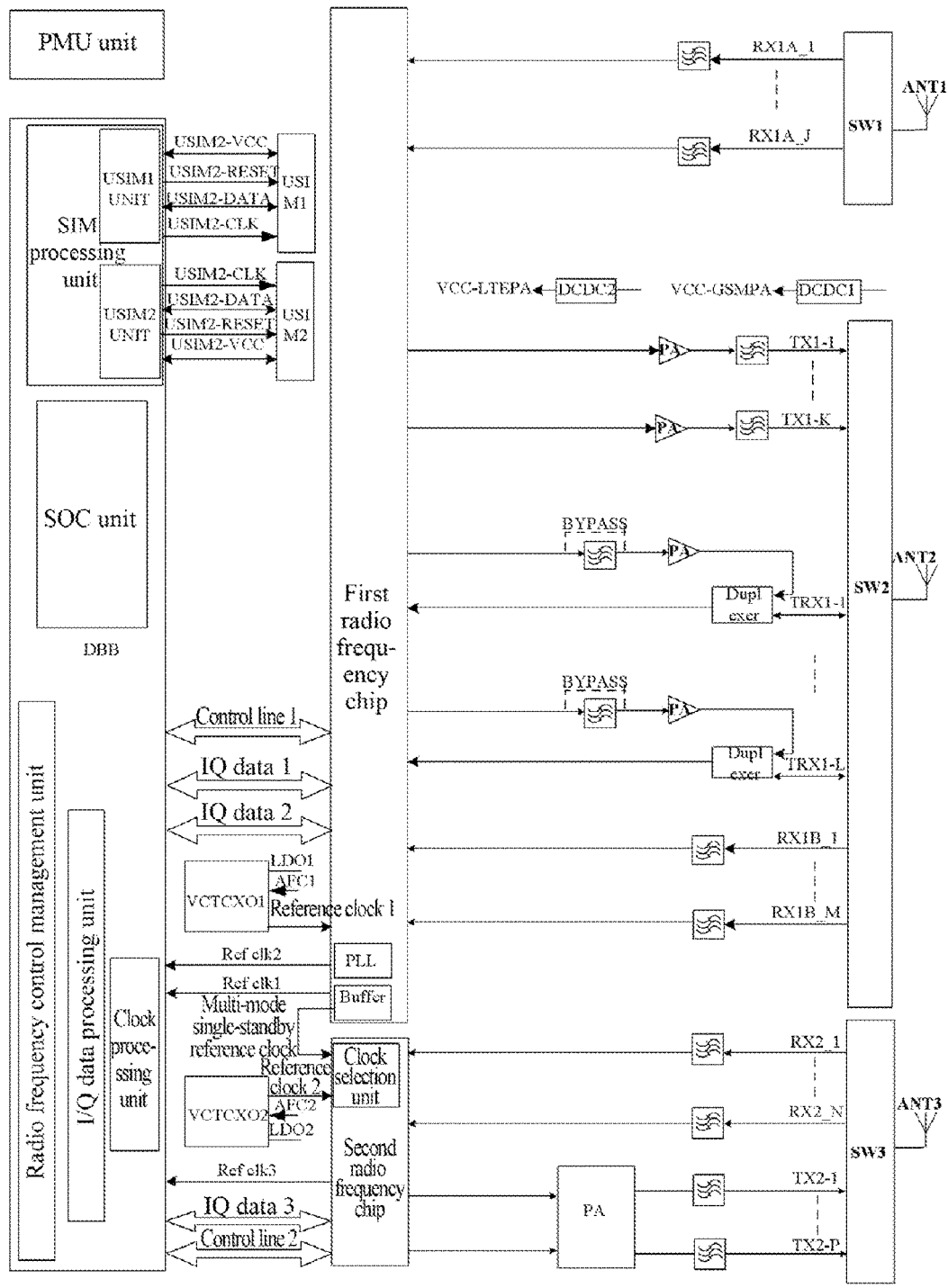
FIG. 2 is an architectural block diagram of the radio frequency portion of a multi-mode terminal in accordance with an embodiment of the present invention.

As shown in FIG. 2, the multi-mode terminal in accordance with the present embodiment comprises: a power management chip (PMU), a first radio frequency chip, a second radio frequency chip, a digital baseband chip, a first card socket, a second card socket, a first clock source and a second clock source. Using one digital baseband chip and one power management chip reduces the area occupied during the PCB layout. Using two separate SIM card sockets, two SIM cards with different modes can be freely placed within any card socket, which can achieve not only the multi-mode multi-standby, but also the switching to multi-mode single-standby mode.

The Power Management Unit (PMU) at least comprises two independent LDOs (low dropout linear regulators), and the two LDOs independently output the 1.8V/3.0V power supply to respectively supply power to the first card socket and the second card socket, and also supply power to the digital baseband chip.

The digital baseband chip is used for transmitting and receiving LTE, TD-SCDMA, GSM and WCDMA in-phase/quadrature (I/Q) signals and other I/Q signals, controlling reception paths and transmission paths of LTE, TD-SCDMA, GSM and WCDMA and so on, and simultaneously processing LTE and GSM I/Q signals; LTE and TD-SCDMA I/Q signals; LTE and WCDMA I/Q signals; and TD-SCDMA and GSM I/Q signals; the digital baseband chip internally comprises an clock processing unit, an I/Q data processing unit, a radio frequency control management unit, a SIM card processing unit and a SOC (system-on-chip) unit;

In the two radio frequency chips, the first radio frequency chip at least supports receiving and transmitting LTE/TD-SCDMA/GSM RF signals, and internally comprises a clock Buffer and a clock PLL (phase lock loop); the second radio frequency chip at least supports receiving and transmitting GSM/TD-SCDMA/WCDMA RF signals; and internally comprises a clock selection unit; the output of the clock Buffer of the first radio frequency chip enters into the clock selection unit via a clock path.

There are three radio frequency switches, one is used for switching between respective frequency bands of the receiving channel of the LTE secondary path, one is used for switching between respective frequency bands of the transceiver channel of the LTE primary path, and another is used for switching between respective frequency bands of another mode of radio frequency transceiver channel.

The first clock source and the second clock source respectively provide reference clocks to the first radio frequency chip and the second radio frequency chip.

A plurality of power amplifiers (PAs) amplifies the radio frequency signal output from the radio frequency chips.

A plurality of high-power resistant filters is used to filter out-of-band stray signals in the output signals of the power amplifier.

A plurality of low-power resistant filters is used to filter out-of-band stray signals in the received signals.

Two DCDC devices respectively supply power to the power amplifiers.

The first card socket and the second card socket can be respectively and independently inserted with any USIM card/SIM card.

Figure 3:
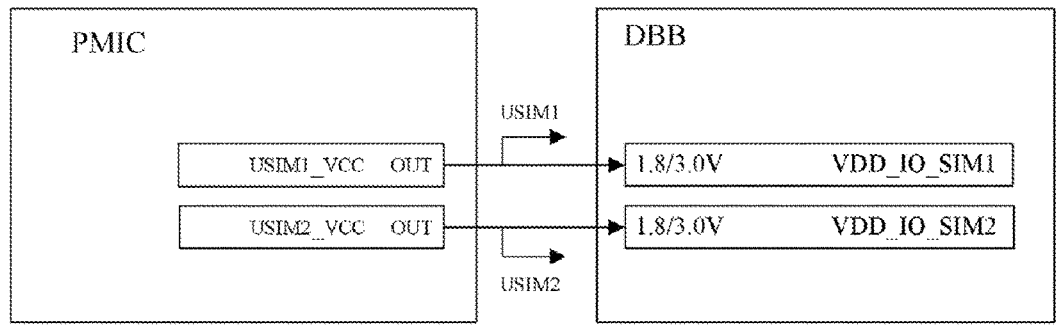
FIG. 3 is a schematic diagram of a power supply in accordance with an embodiment of the present invention.

As shown in FIG. 3, the power management unit (PMU) at least comprises two independent LDOs, and the two LDO respectively and independently output the 1.8V/3.0V power supply to respectively supply power to the first card socket and the second card socket, and also supply power to the digital baseband chip.

Figure 4:
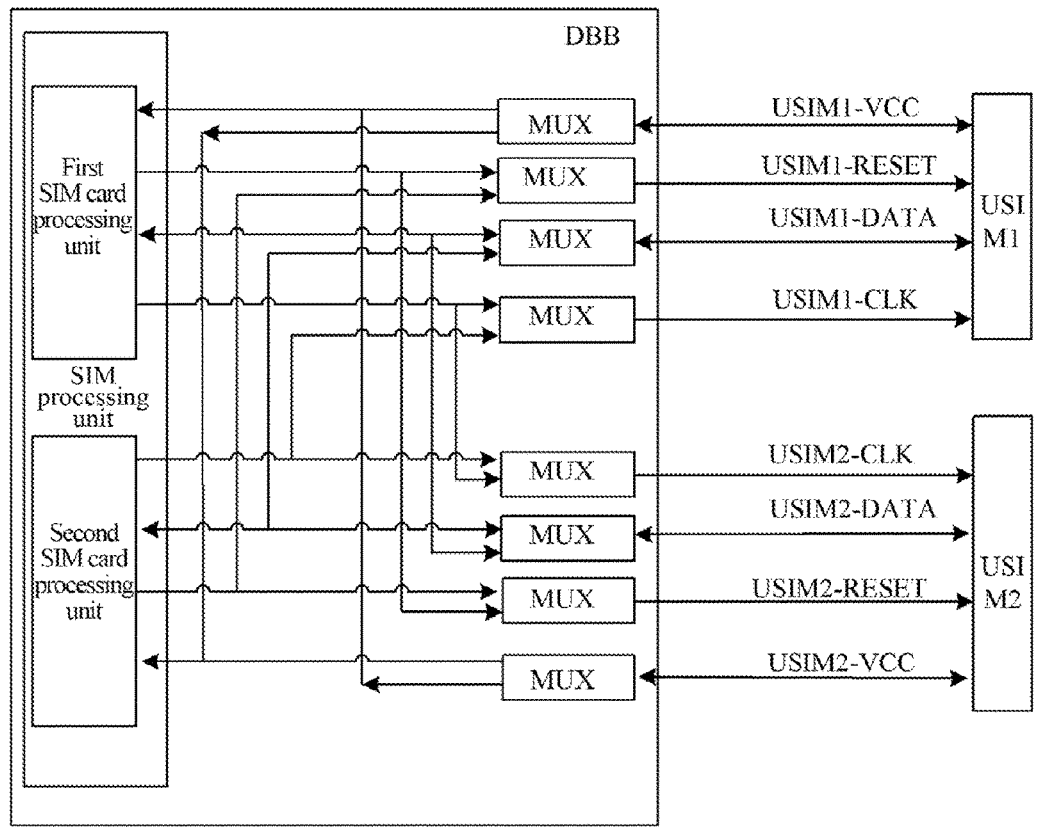
FIG. 4 is a block diagram of a SIM processing unit in accordance with an embodiment of the present invention.

The digital baseband chip is used to transmit and receive LTE, TD-SCDMA, GSM and WCDMA I/Q signals and other I/Q signals, which can control transmission paths and reception paths of the LTE, TD-SCDMA, GSM and WCDMA and so on, and can simultaneously process LTE and GSM I/Q signals; LTE and TD-SCDMA I/Q signals; LTE and WCDMA I/Q signals; TD-SCDMA and GSM I/Q signals; the digital baseband chip internally comprises a clock processing unit, an I/Q data processing unit, a radio frequency control unit, a SIM card processing unit and a SOC unit;

As shown in FIG. 4, the SIM card processing unit internally comprises separate first SIM card processing unit and second SIM card processing unit, and signals (USIM1_VCC, USIM1_RESET, USIM1_DATA, USIM1_CLK, USIM2_VCC, USIM2_RESET, USIM2_DATA, USIM2_CLK) on two external USIM cards/SIM cards are respectively connected to corresponding pins of the digital baseband chip, and one end of the MUX (multiplexer) is connected to the pin of the SIM card, and the other end of the MUX is respectively connected to the corresponding functional ends of the first SIM card processing unit and the second SIM card processing unit. The pin of the SIM card selects the connected USIM card/SIM card processing unit via the MUX.

Figure 5:
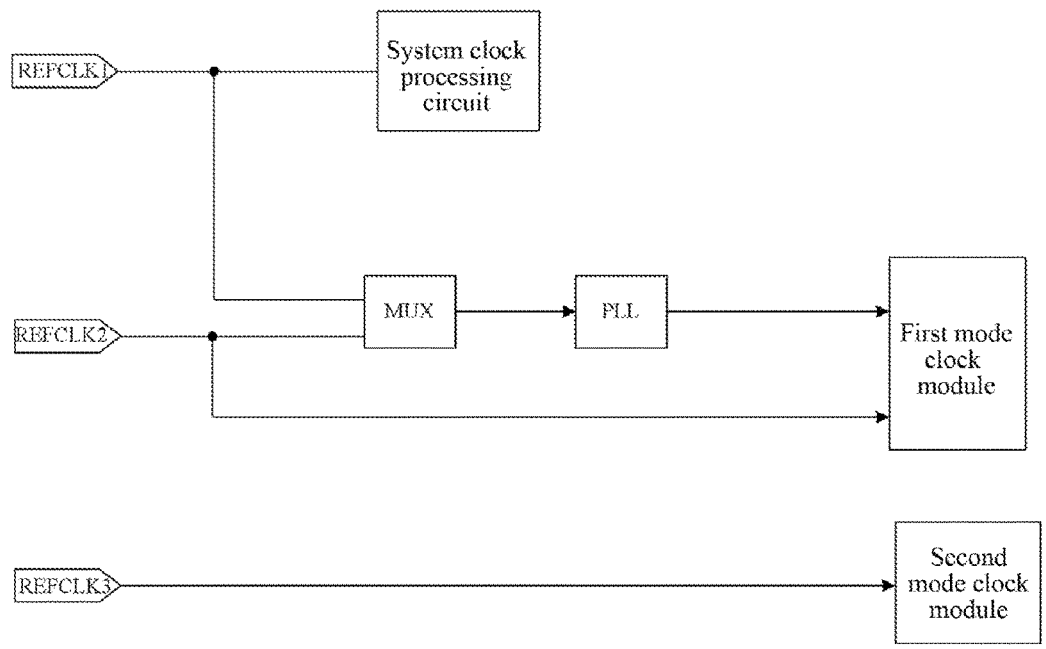
FIG. 5 is a block diagram of a clock processing unit in accordance with an embodiment of the present invention.

As shown in FIG. 5, the clock processing unit comprises at least three clock input ports, and comprises a system clock processing unit, a clock selection MUX, a phase lock loop (PLL), a first mode clock module, a second mode clock module, a first clock input end (REFCLK1), a second clock input end (REFCLK2) and a third clock input end (REFCLK3), and the first mode clock module and the second mode clock module may be one of the LTE clock module, the TD-SCDMA clock module, the GSM clock module, the WCDMA clock module, and the like, for example, the first mode clock module can be a LTE/TD-SCDMA/GSM clock module, the second mode clock module can be a GSM/TD-SCDMA/WCDMA clock module. The REFCLK1 is provided to the system clock processing unit, the REFCLK1, together with the REFCLK2, is further connected to the input end of the clock selection MUX, the output end of the clock selection MUX is connected to the input end of the PLL, the output end of the PLL is connected to the first mode clock module to provide a working clock for the first mode clock module. The REFCLK2 serves as a random sampling clock, and it is directly connected to the first mode clock module and provides a working clock for the first mode clock module. The REFCLK3 provides a working clock for the second mode clock module.

Figure 6:
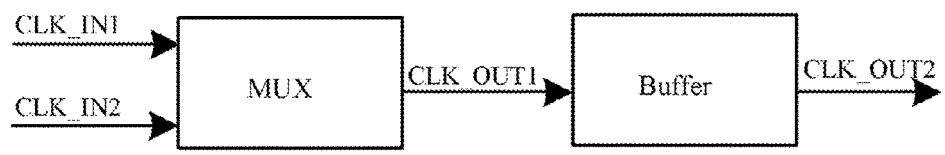
FIG. 6 is a block diagram of a clock selection unit in accordance with an embodiment of the present invention.

As shown in FIG. 6, the clock selection unit comprises a MUX (multiplexer) and a clock Buffer. The input end of the MUX is connected to the clock path and the second clock source, the output end of the MUX is connected to the input end of the clock Buffer, and the output of the Buffer clock serves as the reference clock of the second radio frequency chip. When the terminal works in the multi-mode single-standby mode, the CLK_IN1 (connected to the clock path) is selected as the reference clock of the radio frequency chip 2, and when the terminal works in the multi-mode dual-standby mode, the CLK_IN2 (connected to the second clock source) is selected as the reference clock of the radio frequency chip 2.

Figure 7:
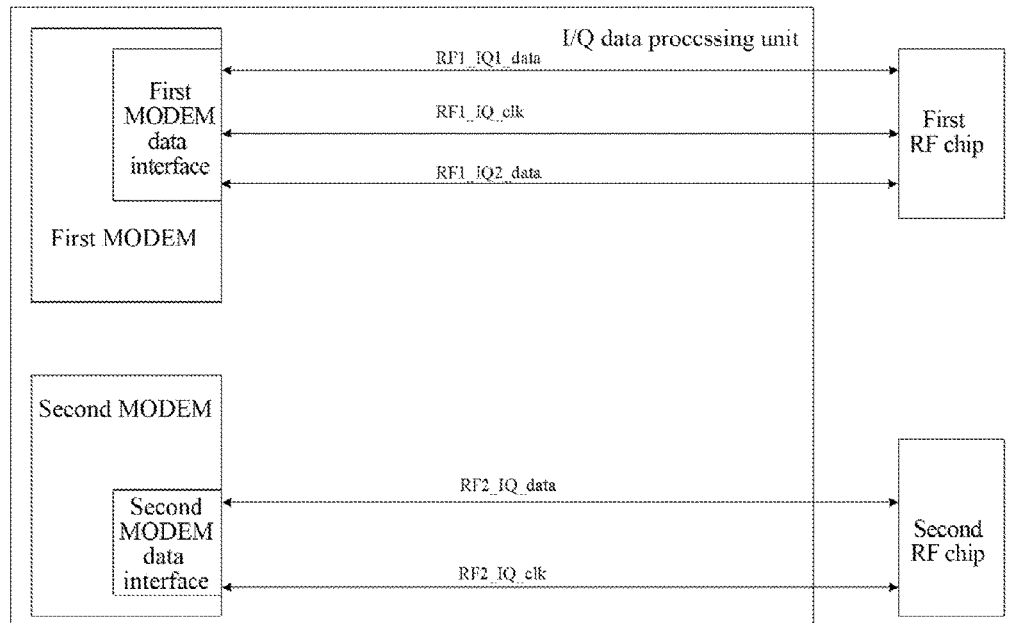
FIG. 7 is a block diagram of an IQ data processing unit in accordance with an embodiment of the present invention.

As shown in FIG. 7, the I/Q data processing unit comprises a first modem, a second modem, three groups of data IQ interfaces, and two groups of sampling clocks. The first radio frequency chip is connected to the first MODEM through the first IQ data line (RF1_IQ1_data), the second IQ data line (RF1_IQ2_data) and the first sampling clock interface line (RF1_IQ_clk), and the first RF chip transmits data with the first MODEM. The second RF chip is connected to the second MODEM through the third IQ data line (RF2_IQ_data) and the second sampling clock interface line (RF2_IQ_clk) to achieve data transmission between the second RF chip and the second MODEM.

Figure 8:
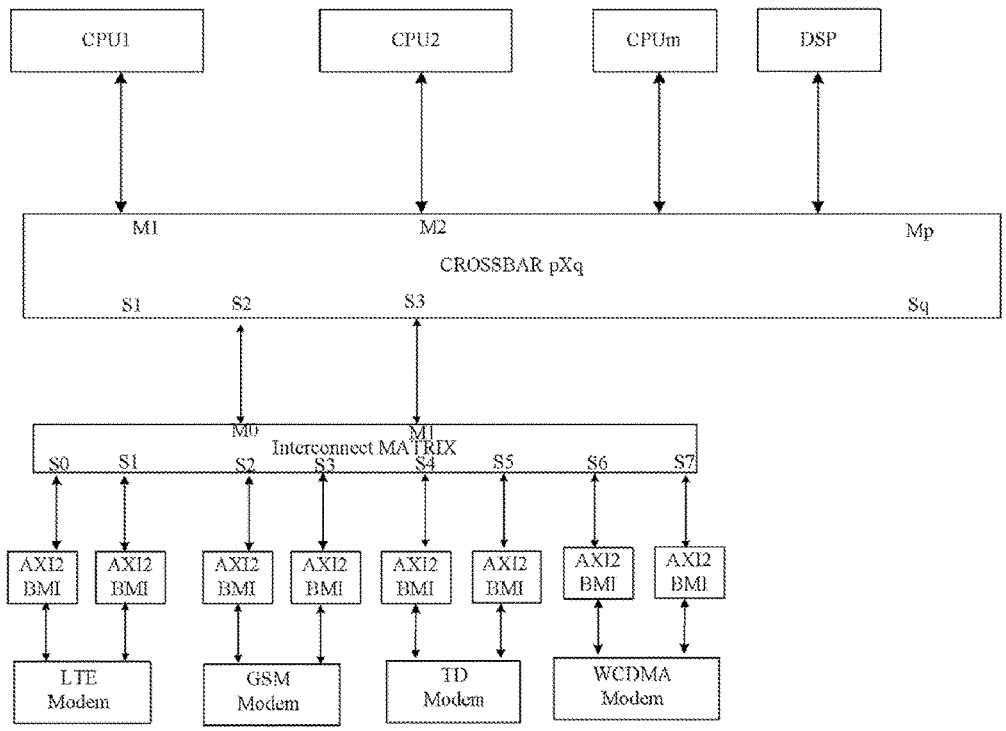
FIG. 8 is a block diagram of a SOC unit in accordance with an embodiment of the present invention.

As shown in FIG. 8, the SOC unit implements functions, such as scheduling of the multi-mode dual-standby and the multi-mode single-standby, processesing data of the two modes, and completing the controlling of the entire terminal. Internally it mainly comprises a plurality of central processing units (CPUs) and digital signal processing units (DSPs), and the CPUs implements communication between the processors through the CROSSBAR MATRIX. A plurality of modems with different modes, such as LTE MODEM, TD-SCDMA MODEM, GSM MODEM, WCDMA MODEM, and so on, is hung to a plurality of ports of the CROSSBAR MATRIX through an Interconnect Matrix, so as to achieve that any one CPU can communicate with any MODEM, and any two CPUs can simultaneously communicate with two MODEMs. A plurality of modems with different modes works as the first modem or the second modem to connect with the first modem or the second modem.

Figure 9:
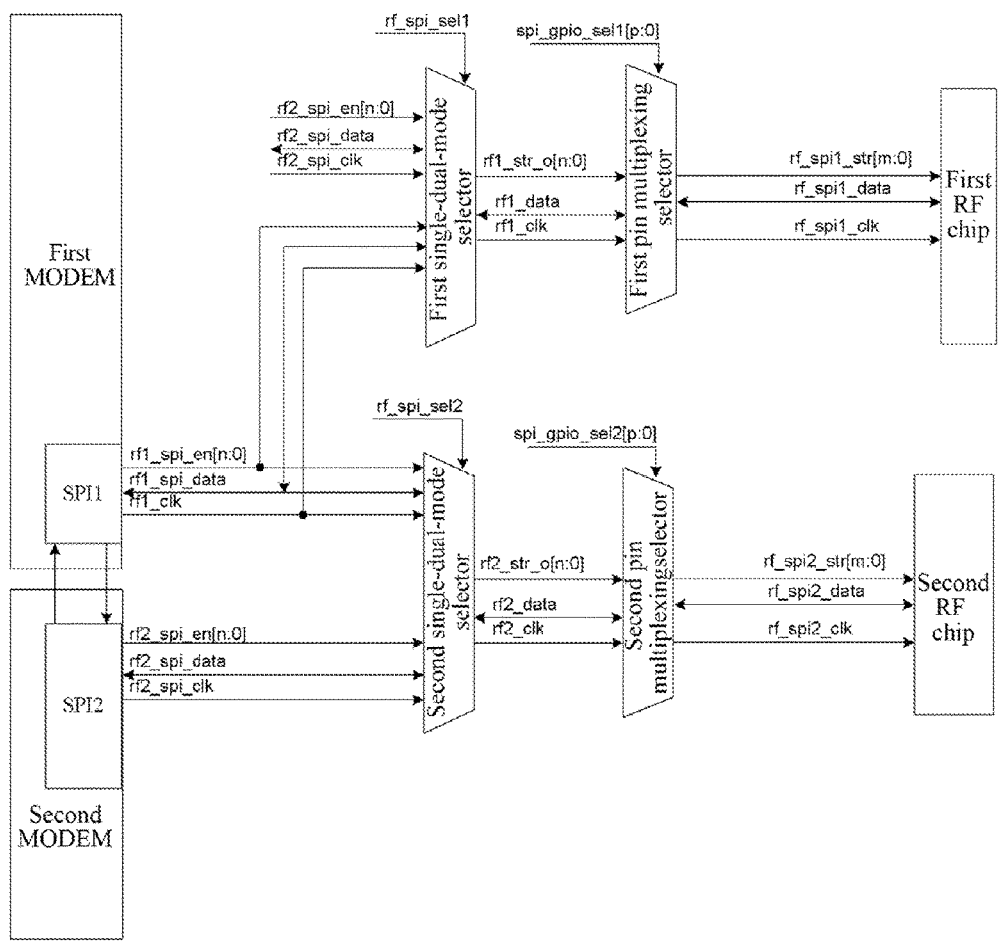
FIG. 9 is a block diagram of a radio frequency SPI control unit in accordance with an embodiment of the present invention.

As shown in FIG. 9, the digital baseband chip comprises a radio frequency control management unit, and the radio frequency control management unit comprises a radio frequency SPI control unit, and the radio frequency SPI control unit internally uses a pin multiplexing selector and a single-dual-mode selector. The SPI of the first MODEM is split into two paths, one path is connected to the first single-dual-mode selector, and the other path is connected to the second single-dual-mode selector. The SPI of the second MODEM is split into two paths, one path is connected to the first single-dual-mode selector, and the other path is connected to the second single-dual-mode selector. The first single-dual-mode selector is connected to the first pin multiplexing selector, and the second single-dual-mode selector is connected to the second pin multiplexing selector, the first pin multiplexing selector is connected to the SPI pin of the first radio frequency chip, and the second pin multiplexing selector is connected to the SPI pin of the second radio frequency chip.

The main purpose of this structure is that two SPIs independently control two radio frequency modules in the case of multi-mode dual-standby, and one SPI can control two radio frequency modules in the case of multi-mode single-standby.

Figure 10:
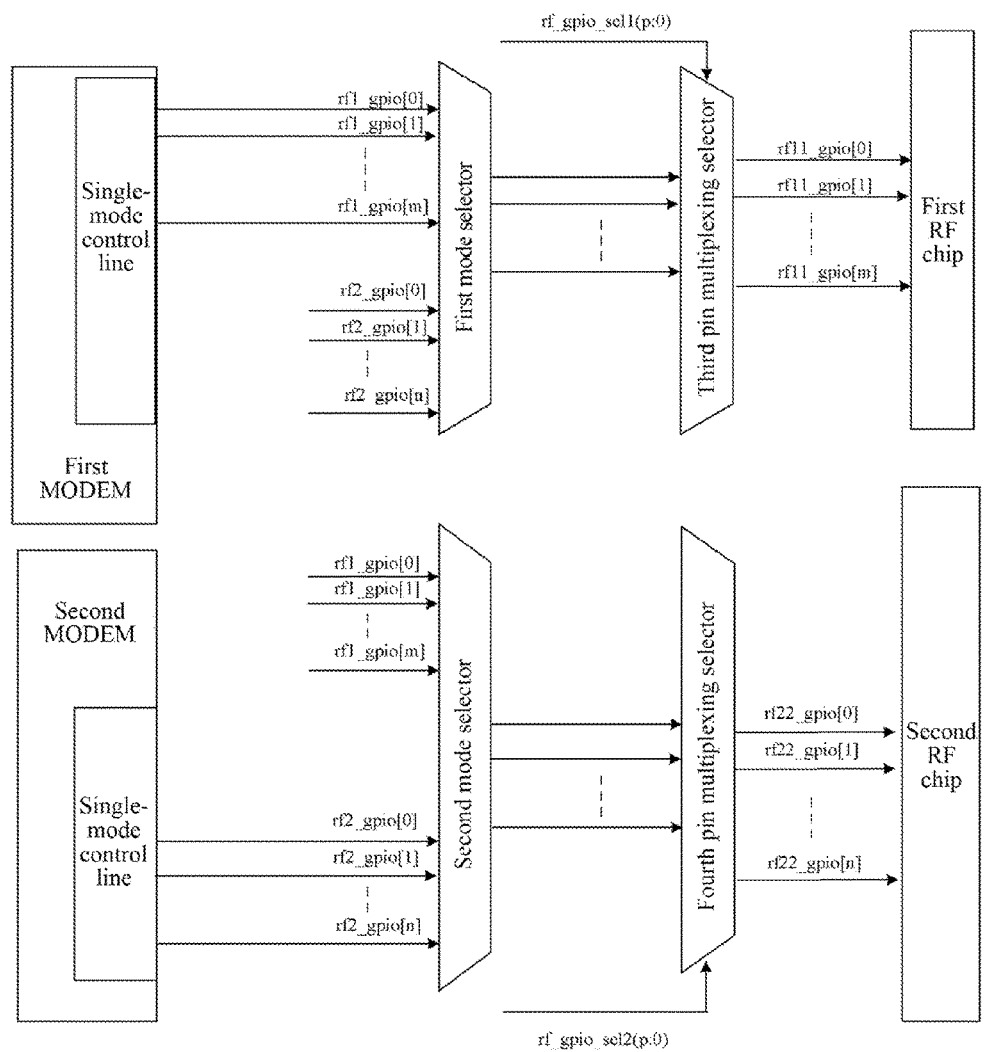
FIG. 10 is a block diagram of a radio frequency GPIO control unit in accordance with an embodiment of the present invention.

As shown in FIG. 10, the digital baseband chip comprises a radio frequency control management unit, and the radio frequency control management unit comprises a radio frequency GPIO control unit, and the radio frequency GPIO control unit internally uses two pin multiplexing selectors (the third pin multiplexing selector and the fourth pin multiplexing selector), two mode selectors (the first mode selector and the second mode selector). The control line of the first MODEM is divided into two paths, one path is connected to the first mode selector, and the other path is connected to the second mode selector. The control line of the second MODEM is divided into two paths, one path is connected to the second mode selector, and the other path is connected to the first mode selector. The first mode selector is connected to the third pin multiplexing selector, and the third pin multiplexer is connected to the corresponding GPIO pin of the first radio frequency chip. The second mode selector is connected to the fourth pin multiplexing selector, and the fourth pin multiplexer is connected to the corresponding GPIO pin of the second radio frequency chip.

The mode selector is essentially a group of switching selection unit arrays. The main purpose of this structure is that two sets of GPIO independently control two radio frequency modules in the case of multi-mode dual-standby, one set of GPIO controls two radio frequency modules in the case of multi-mode single-standby.

The dual-mode dual-active handover working process:
in step one: the DBB controls the second radio frequency chip to select the second clock source as a reference clock of the second radio frequency chip;
in step two: the central processor of the DBB independently and respectively operates MODEMs with various modes at the same time through the CROSSBAR;

in step three: the DBB controls the first single-dual-mode selector to select the SPI of the first modem, the first single-dual-mode selector is connected to the SPI pins of the first radio frequency chip through the first pin multiplexing selector and controls the second single-dual-mode selector to select the SPI of the second modem, and the second single-dual-mode selector is connected to the SPI pin of the second radio frequency chip through the second pin multiplexing selector;

in step four: the DBB controls the first mode selector to select the GPIO of the first MODEM, the first mode selector is connected to the GPIO pin of the first radio frequency chip through the third pin multiplexing selector, the DBB controls the second mode selector to select the GPIO of the second MODEM, and the second mode selector is connected to the GPIO pin of the second radio frequency chip through the fourth pin multiplexing selector;

in step five: it is to perform normal multi-mode multi-standby and dual-active operation.

Dual-mode single-standby handover working process:

in step one: the DBB controls the second radio frequency chip to select the output clock of the first radio frequency chip as the reference clock of the second radio frequency chip;

in step two: the central processor of the DBB independently and respectively operates MODEMs with various modes through the CROSSBAR;

in step three: the DBB controls the first single-dual-mode selector to select the SPI of the first modem or second modem, and the first single-dual-mode selector is connected to the SPI pin of the first RF chip through the first pin multiplexing selector and controls the second single-dual-mode selector to select the SPI of the first or second modem, and the second single-dual-mode selector is connected to the SPI pin of the second radio frequency chip through the second pin multiplexing selector;

in step four: the DBB controls the first mode selector to select the GPIO of the first or second MODEM, the first mode selector is connected to the GPIO pin of the first radio frequency chip through the third pin multiplexing selector, and controls the second mode selector to select the GPIO of the first or second MODEM, and the second mode selector is connected to the GPIO pin of the second radio frequency chip through the fourth pin multiplexing selector;

in step five: it is to perform normal multi-mode single-standby operation.

Obviously, a person skilled in the art should understand that the respective modules or steps in the embodiments of the present invention can be implemented with general-purpose computing devices, they can be concentrated on a single computing device or distributed in a network consisting of multiple computing devices, alternatively, they may be executed by program codes executable by computing devices, so that they can be stored in storage means and executed by computing devices, or they can be made into individual integrated circuit modules, or some of the modules or steps therein can be made into a single integrated circuit module to implement. Therefore, the present document is not limited to any specific hardware and software combination.

The above description is only preferred embodiments of the present invention, and it is not used to limit the embodiments of the present invention, for those skilled in the art, the embodiments of the present invention may have various modifications and changes. Any modifications, equivalent replacements and improvements made within the spirit and principle of the embodiments of the present invention should be within the protection scope of the embodiments of the present invention.

INDUSTRIAL APPLICABILITY

The multi-mode terminal in the embodiment of the present invention can achieve functions such as multi-mode single-standby, multi-mode dual-standby, single-card multi-mode and dual-card dual-standby to meet current needs of mobile operators and mobile terminal users. Two SIM cards with different modes can be freely placed in any card socket, and the USIM/SIM card in any card socket can be read and written by any mode, which can achieve not only the multi-mode multi-standby, but also the switching to the multi-mode single-standby mode, and not only the dual-card dual-standby, but also the single-card dual-standby.

What is claimed is:

1. A multi-mode terminal, comprising: a power management chip, a digital baseband chip, a first radio frequency chip, a second radio frequency chip, a first card socket, a second card socket, a first clock source and a second clock source, wherein:

the power management chip is connected to the digital baseband chip, the first card socket and the second card socket to supply power to the digital baseband chip, the first card socket and the second card socket;

the digital baseband chip is further connected to the first card socket and the second card socket, and is respectively connected to the first radio frequency chip and the second radio frequency chip through an in-phase/quadrature (I/Q) data line and a control line to transmit, receive and process I/Q signals with supported modes, as well as control transmission paths and reception paths with the supported modes;

the first clock source is connected to the first radio frequency chip to provide a reference clock for the first radio frequency chip; the second clock source is connected to the second radio frequency chip to provide a reference clock for the second radio frequency chip, and a clock path is further connected between the first radio frequency chip and the second radio frequency chip, and the first radio frequency chip provides an output clock for the second radio frequency chip through the clock path to serve as the reference clock of the second radio frequency chip; wherein the digital baseband chip comprises a subscriber identity module (SIM) card processing unit, and the SIM card processing unit comprises a first SIM card processing unit, a second SIM card processing unit, and a multiplexer (MUX) one-to-one corresponding to each pin of the first card socket and the second card socket, one side of the MUX is connected to a corresponding pin, and the other side is respectively connected to functional ends of the first SIM card processing unit and the second SIM card processing unit which correspond to pins.

2. The terminal of claim 1, wherein the digital baseband chip comprises a clock processing unit, and the clock processing unit comprises a system clock processing unit, a clock selection MUX, a phase lock loop (PLL), a first mode clock module, a second mode clock module, a first clock input end, a second clock input end and a third clock input end, wherein:

the first clock input end is connected to the system clock processing unit to provide a working clock for the system clock processing unit;

the first clock input end, together with the second clock input end, is further connected to an input end of the clock selection MUX, and an output end of the clock selection MUX is connected to an input end of the PLL, and an output end of the PLL is connected to the first mode clock module and provides a working clock for the first mode clock module;
the second clock input end is further directly connected to the first mode clock module to provide a working clock for the first mode clock module;
the third clock input end is connected to the second mode clock module to provide a working clock for the second mode clock module.

3. The terminal of claim 2, wherein the first clock input end is further connected to a clock buffer in the first radio frequency chip; the second clock input end is further connected to a clock phase lock loop (PLL) in the first radio frequency chip; the third clock input end is further connected to the second radio frequency chip.

4. The terminal of claim 1, wherein the second radio frequency chip comprises a clock selection unit, and the clock selection unit comprises a multiplexer and a clock buffer, and an input end of the multiplexer is connected to the clock path and the second clock source, and an output end of the multiplexer is connected to an input end of the clock buffer, and an output of the clock buffer serves as the reference clock of the second radio frequency chip.

5. The terminal of claim 1, wherein the digital baseband chip comprises an I/Q data processing unit, and the I/Q data processing unit comprises a first modem and a second modem, and the first modem is connected to the first radio frequency chip via a first IQ data line, a second IQ data line and a first sampling clock interface line; the second modem is connected to the second radio frequency chip through a third IQ data line and a second sampling clock interface line.

6. The terminal of claim 5, wherein the digital baseband chip comprises a system-on-chip (SOC) unit, and the SOC unit comprises a plurality of central processing units (CPUs) and digital signal processing units (DSPs), and the plurality of CPUs and DSPs communicate through a crossbar matrix, and a plurality of modems with different modes is hung at ports of the crossbar matrix via an Interconnect matrix, and the plurality of modems with different modes are further connected to the first modem or the second modem.

7. The terminal of claim 5, wherein the digital baseband chip comprises a radio frequency control management unit, and the radio frequency control management unit comprises a radio frequency serial peripheral interface (SPI) control unit, and the radio frequency SPI control unit comprises a first single-dual-mode selector, a second single-dual-mode selector, a first pin multiplexing selector and a second pin multiplexing selector, and a SPI of the first modem is respectively connected to the first single-dual-mode selector and the second single-dual-mode selector, and a SPI of the second modem is respectively connected to the first single-dual-mode selector and the second single-dual-mode selector, and the first single-dual-mode selector is connected to a SPI pin of the first radio frequency chip through the first pin multiplexing selector, and the second single-dual-mode selector is connected to a SPI pin of the second radio frequency chip through the second pin multiplexing selector.

8. The terminal of claim 5, wherein the digital baseband chip comprises a radio frequency control management unit, and the radio frequency control management unit comprises a radio frequency general purpose input output (GPIO) control unit, and the radio frequency GPIO control unit comprises a first mode selector, a second mode selector, a third pin multiplexing selector and a fourth pin multiplexing selector, and a control line of the first modem is respectively connected to the first mode selector and the second mode selector, and a control line of the second modem is respectively connected to the first mode selector and the second mode selector, and the first mode selector is connected to a GPIO pin of the first radio frequency chip through the third pin multiplexing selector, and the second mode selector is connected to a GPIO pin of the second radio frequency chip through the fourth pin multiplexing selector.

9. The multimode terminal according to claim 1, wherein:
the digital baseband chip controlling the second radio frequency chip to select the second clock source as the reference clock;
the digital baseband chip independently and respectively operating modems with different modes;
the digital baseband chip controlling a first single-dual-mode selector to select a serial peripheral interface (SPI) of a first modem, the first single-dual-mode selector being connected to a SPI pin of the first radio frequency chip through a first pin multiplexing selector, and controlling a second single-dual-mode selector to select a SPI of a second modem, and the second single-dual-mode selector being connected to a SPI pin of the second radio frequency chip through a second pin multiplexing selector;
the digital baseband chip controlling a first mode selector to select a general purpose input output (GPIO) of the first modem, the first mode selector being connected to a GPIO pin of the first radio frequency chip through a third pin multiplexing selector, and controlling a second mode selector to select a GPIO of the second modem, and the second mode selector being connected to a GPIO pin of the second radio frequency chip through a fourth pin multiplexing selector.

10. The multimode terminal according to claim 1, wherein:
the digital baseband chip controlling the second radio frequency chip to select an output clock of the first radio frequency chip as the reference clock;
the digital baseband chips independently and respectively operating modems with different modes;
the digital baseband chip controlling a first single-dual-mode selector to select a Serial Peripheral Interface (SPI) of a first modem or a SPI of a second modem, and the first single-dual-mode selector being connected to a SPI pin of the first radio frequency chip through a first pin multiplexing selector, and controlling a second single-dual-mode selector to select the SPI of the first modem or the SPI of the second modem, the second single dual-mode selector being connected to a SPI pin of the second radio frequency chip through a second pin multiplexing selector;
the digital baseband chip controlling a first mode selector to select a general purpose input output (GPIO) of the first modem or a GPIO of the second modem, the first mode selector being connected to a GPIO pin of the first radio frequency chip via a third pin multiplexing selector, and controlling a second mode selector to select the GPIO of the first modem or the GPIO of the second modem, and the second mode selector being connected to a GPIO pin of the second radio frequency chip through a fourth pin multiplexing selector.

* * * * *